US012346426B2

(12) United States Patent
Benkreira et al.

(10) Patent No.: US 12,346,426 B2
(45) Date of Patent: Jul. 1, 2025

(54) COMPUTER AUTHENTICATION USING KNOWLEDGE OF FORMER DEVICES

(71) Applicant: Capital One Services, LLC, McLean, VA (US)

(72) Inventors: Abdelkader M'hamed Benkreira, Washington, DC (US); Joshua Edwards, Philadelphia, PA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 270 days.

(21) Appl. No.: 17/947,667

(22) Filed: Sep. 19, 2022

(65) Prior Publication Data

US 2024/0095327 A1 Mar. 21, 2024

(51) Int. Cl.
*G06F 21/34* (2013.01)
*G06N 20/00* (2019.01)

(52) U.S. Cl.
CPC ............. *G06F 21/34* (2013.01); *G06N 20/00* (2019.01)

(58) Field of Classification Search
CPC ................................ G06F 21/34; G06N 20/00
USPC ........................................................ 726/16
See application file for complete search history.

(56) References Cited

U.S. PATENT DOCUMENTS

| | | | | |
|---|---|---|---|---|
| 10,572,653 | B1 * | 2/2020 | Semichev | G06N 3/08 |
| 11,743,330 | B1 * | 8/2023 | Gilbert | G06F 21/45 |
| | | | | 709/203 |
| 2017/0012785 | A1 | 1/2017 | Haga et al. | |
| 2020/0245142 | A1 | 7/2020 | Manepalli et al. | |
| 2022/0286300 | A1 * | 9/2022 | Draper | H04N 21/25866 |
| 2023/0196210 | A1 * | 6/2023 | Bustelo-Killam | G06N 3/08 |
| | | | | 706/12 |

OTHER PUBLICATIONS

"Dynamic Knowledge-Based Authentication Asks Customers Out-of-Wallet Questions to Verify Identity & Deter Cybersecurity Fraud," Idology, a GBC Company, retrieved from: https://www.idology.com/dynamic-kba [Jun. 7, 2021 2:36:41 PM], pp. 1-9.

(Continued)

*Primary Examiner* — Linglan Edwards
*Assistant Examiner* — Phuc Pham
(74) *Attorney, Agent, or Firm* — Banner & Witcoff, Ltd.

(57) ABSTRACT

Methods, systems, and apparatuses are described herein for improving computer authentication processes through computer-based authentication in a manner that uses knowledge of former devices. A computing device may train a machine learning model to output an indication of device reliability data associated with a particular device. The computing device may receive a request for access to an account from a user. The computing device may receive account data and provide the account data to the trained machine learning model. The computing device may receive data indicating device reliability for a set of devices from the machine learning model. The computing device may generate a modified set of device choices for the user by excluding devices having reliability levels below a threshold value. An authentication question may be generated, and access to the account may be provided based on a response to the authentication question.

20 Claims, 7 Drawing Sheets

(56) References Cited

OTHER PUBLICATIONS

Baukes, Mike, "Everybody Knows: How Knowledge-Based Authentication Died," Forbes Technology Councel, Jan. 22, 2018, retrieved from: https://www.forbes.com/sites/forebestechcouncil/2018/01/22/everybody-know-how-knowledge-based-authentication-died/?sh=4441a6c94eee[Jun. 7, 2021 2:41:51 PM], pp. 1-5.

Cole, Bryan, "Dynamic KBA—The Best Security Questions," retrieved from: https://www.identropy.com/blog/iam-blog/bid/110793/dynamic-kba-the-best-security-questions [Jun. 7, 2021 2:39:34 PM], pp. 1-4.

Dwivedi, Prasoon, et al., "Challenges and Best Practices in KBA Schemes," EMC Proven Professional Knowledge Sharing, 2015. pp. 1-17.

Hearn, Chalres, "Answering My Own Authentication Questions Prove That They're Useless," Aug. 29, 2018, retrieved from: https://alloy.co/blog/answering-my-own-authentication-questions-prove-that-theyre-usless [Jun. 7, 2021 2:44:10 PM], pp. 1-8.

\* cited by examiner

True Device Choices From Last Five Years:

SmartPhone 13 Pro
SmartPhone SE
SmartPhone 7
Genius P4
SmartPad Air

Initial True Device Choices
(601)

Modified True Device Choices From Last Five Years:

SmartPhone 13 Pro
SmartPhone SE

Modified True Device Choices
(602)

FIG. 6A

COMPUTER AUTHENTICATION USING KNOWLEDGE OF FORMER DEVICES

FIELD OF USE

Aspects of the disclosure relate generally to computer authentication. More specifically, aspects of the disclosure may provide for improvements in the method in which authentication questions are generated by computing devices by processing transaction and device information.

BACKGROUND

As part of determining whether to grant a user access to content (e.g., as part of determining whether to provide a caller access to a telephone system that provides banking information), a user of the user device may be prompted with one or more authentication questions. Such questions may relate to, for example, a password of the user, a personal identification number (PIN) of the user, or the like. Those questions may additionally and/or alternatively be generated based on personal information of the user. For example, when setting up an account, a user may provide a variety of answers to predetermined questions (e.g., "Where was your father born?," "Who was your best friend in high school?"), and those questions may be presented to the user as part of an authentication process. As another example, a commercially-available database of personal information may be queried to determine personal information for a user (e.g., their birthdate, birth location, etc.), and that information may be used to generate an authentication question (e.g., "Where were you born, and in what year?"). A potential downside of these types of authentication questions is that the correct answers may be obtainable and/or guessable for someone who has information about a particular user.

As part of authenticating a computing device, a user might be asked to identify one or more computing devices that they have previously used to access an account (e.g., via a website). For example, a user may be asked questions about one or more devices used by the user in the past to interact with a website and/or access an online account (e.g., "Which type of phone did you use in July 2020?," "Which of the following devices have you had in the past five years?," or the like). Such questions may prompt a user to provide a textual answer (e.g., by inputting an answer in a text field), to select one of a plurality of answers (e.g., select a single correct answer from a plurality of candidate answers), or the like. In some instances, the user may be asked about devices that they did not own or use to authenticate with the account. For example, a computing device may generate a false device choice (that is, a device that was never used or owned by a user), and ask a user to confirm whether or not they logged into an account using a particular device. Authentication questions can be significantly more useful when they can be based on either real devices or false devices: after all, if every question related to a real device, a nefarious user could use personal knowledge of a legitimate user to guess the answer, and/or the nefarious user may be able to glean personal information about the legitimate user.

One issue with device-based authentication questions is that they might relate to devices that are not particularly memorable to a user and/or are confusing for a user. This may particularly be the case for devices that the user may use only occasionally to conduct transactions with an institution. For example, the user might use a borrowed device to login to an account to quickly check on the account information. In another example, the user might use a device she owned to access the account for a brief period of time, and that user might later switch to using another device to access the same account. More broadly, given that many users might regularly use a wide variety of devices in their day-to-day life (e.g., a personal smartphone, a work smartphone, a work computer, a personal desktop computer, a personal laptop computer), a user might not readily recall whether they used a particular device to access an account. As such, an authorization process using these devices may become frustrating and time-consuming for a user and waste significant amounts of computing resources.

Aspects described herein may address these and other problems, and generally enable a user to be verified in a more reliable and robust manner, thereby improving the safety of accounts and computer transaction systems and the user experience during the authentication process.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are used to control access to accounts. The improvements described herein relate to performing computer authentication in a manner that prevents certain devices from being presented to a user in device-based authentication question including one or more device choices. For example, if a user used a borrowed device or a device she owned to access an account or login to a website for only a brief period of time, the user might not recall whether she ever had interacted with the account using the device. In such a circumstance, including the names of those devices in the authentication questions and asking the user to identify a real device choice based on her own transaction or login history may confuse the user and frustrate a legitimate user from accessing her account. Conversely, excluding such devices may increase memorability, promote account accessibility to the users, and better protect their accounts from unauthorized access. On the other hand, a roommate or friend close to the user may have the knowledge that the user uses. For example, if a user owns a particular brand of smartphone, then this information might be known by family and friends based on messaging apps used by that user. Along those lines, while the user's family and friends might know that the user has the particular brand of the smartphone, the family/friends might not know which type or model of the particular brand of the smartphone that the user uses to access her account. In this circumstance, asking the user to identify a real device choice based on a type or a model in the authentication question may reduce guessability. For example, the user may be asked "which phone did you use in 2021 to access your account: SmartPhone 13 Pro, SmartPhone 13 Pro Max, SmartPhone 11 or SmartPhone 8?" As will be described in greater detail below, this process is effectuated by determining a reliability level of a particular device from a user's device history using a machine learning model. Based on account data associated with the user, one or more real device choices may be determined. A set of modified real device choices may be generated for the user by excluding certain devices that have low reliability levels. As such, the modified set of real device choices may be presented in an authentication question to minimize confusions, reduce guessability and increase account accessibilities in the user community.

More particularly, and as will be described further herein, a computing device may train, using training data comprising account records from a plurality of different users, a first machine learning model to output an indication of device reliability data associated with a particular device. The account records may be associated with a plurality of devices used by the plurality of different users to access one or more accounts in the account records. The computing device may receive, from a user device, a request for access to an account associated with a user. The computing device may receive, from one or more databases, account data corresponding to the account. The account data may indicate one or more logins originated from the user. For example, the account data may indicate a user logged in to an account and performed some account actions, such as changing their e-mail address. Based on the account data, the computing device may determine a device history comprising a set of devices used by the user to login to the account within a predetermined time. The account data may be provided as input to the trained first machine learning model, and data indicating device reliability for the set of devices may be received from the trained first machine learning model. Based on the data indicating device reliability for the set of devices, the computing device may generate a set of modified device choices by excluding one or more devices having corresponding reliability levels below a threshold value, from the set of devices. The computing device may generate an authentication question comprising at least one device choice from the modified set of device choices. Based on the account data and the modified set of device choices, the computing device may generate a correct answer to the authentication question. The computing device may provide the authentication question to the user device and receive, from the user device, a response to the authentication question. Accordingly, the computing device may compare the response to the authentication question to the correct answer, and grant the user device access to the account based on the response to the authentication question matching the correct answer.

The training data to train the first machine learning model may include device information for the plurality of devices used by the plurality of different users, such as a frequency of use for each device of the plurality of devices, a duration of use for each device of the plurality of devices, and a time lapsed since a last use for each device of the plurality of devices. The training data may additionally and/or alternatively include web browser information corresponding to a web browser executed by the plurality of devices used by the plurality of different users. The training data may additionally and/or alternatively include account information such as one or more questions previously presented to the plurality of different users and response to these questions from different users. The training data may additionally and/or alternatively include transaction information indicating whether transactions conducted by the plurality of devices were fraudulent.

The computing device may train a second machine learning model using training data including a history of authentication records. The history of authentication records may include authentication questions and responses associated with different type of devices used by the plurality of different users and the corresponding scoring schemes. The computing device may provide, as input to the trained second machine learning model, input data comprising the authentication question and the response to the authentication question from the user. The computing device may receive, as output from the trained second machine learning model, output data indicating a recommended threshold value associated with the user. The computing device may receive user feedback information indicating whether the set of devices associated with the account data were valid candidates. Based on the user feedback information, the computing device may re-train the second machine learning model to modify the recommended threshold value associated with the set of devices.

The computing device may generate the authentication question including a first device from the modified set of device choices (e.g., a real device choice) and a second device that is not included in the set of devices (e.g., a false device choice). To reduce guessability, the first device and the second device may be associated with a same device manufacturer or a similar price point. Alternatively, the first device and the second device may be available at a same period of time.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6A illustrates illustrative device choices; and

DETAILED DESCRIPTION

Figure 1:
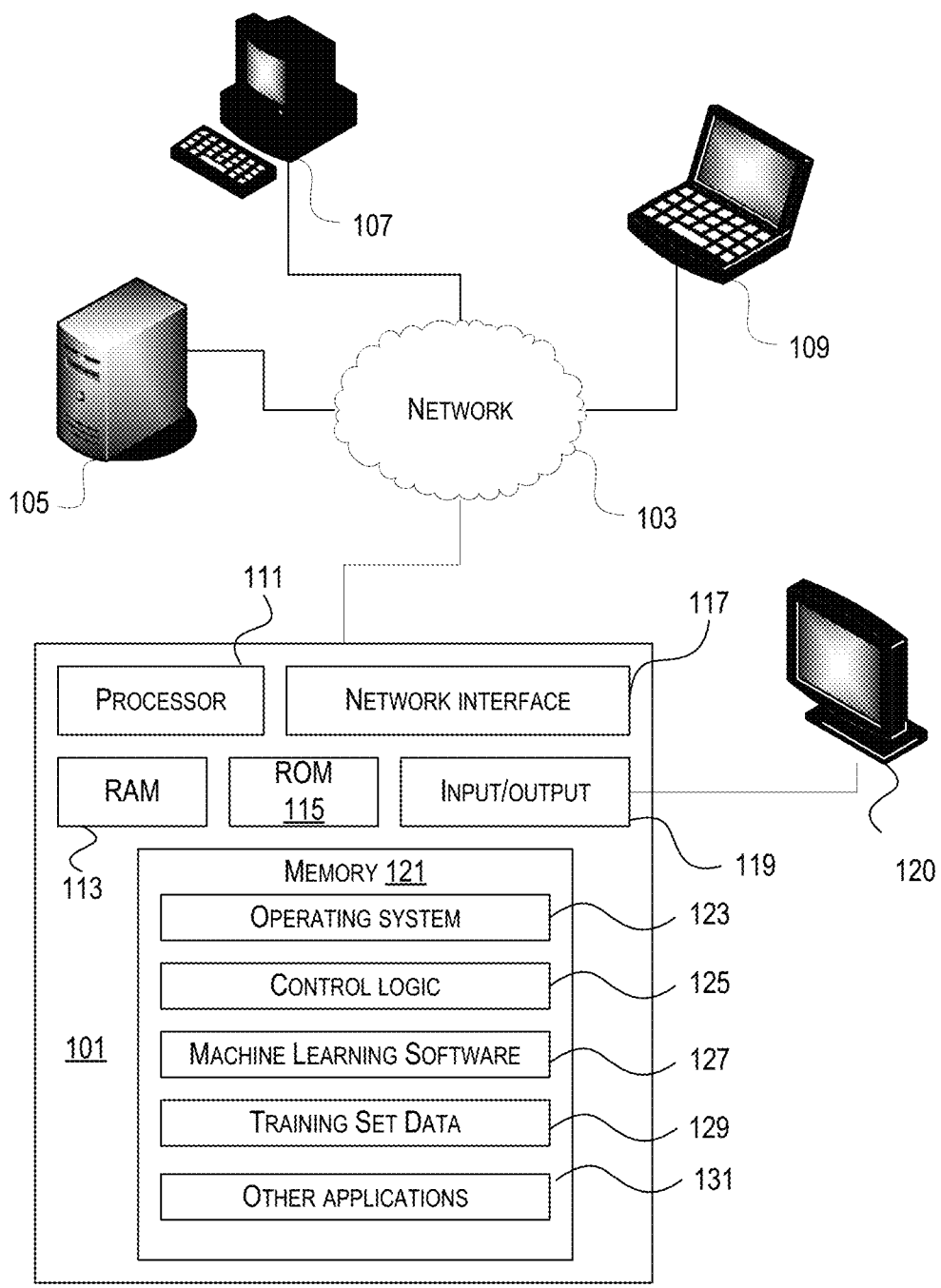
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving authentication questions used by a computing device during a computer-implemented authentication process. In particular, the process depicted herein may involve a computer processing data to determine a set of device choices related to a user's login or transaction history. The login or transaction history may indicate that the user used the set of devices in the past to conduct transactions or otherwise interact with an account. Based on processing described in more detail below, certain devices used to interact with an account might be excluded from the device choices to generate a modified set of device choices because such devices may have low reliability levels. For example, these devices may be used only occasionally, used for a brief period of time, and/or used a long time ago, such that that user may recall them readily. In this manner, authentication questions might be generated using the modified set of device choices and presented in a manner which does not undesirably confuse a user. Using the devices having low reliability levels in the authentication questions may confuse the legitimate user and cause the legitimate user to fail the authentication. Conversely, excluding the potential confusing devices may increase accessibility and promote security on the user accounts.

More particularly, some aspects described herein may provide for a computing device that may train a first machine learning model to output an indication of device reliability data associated with a particular device. The first machine learning model may be trained using training data comprising account records that are associated with a plurality of devices used by a plurality of different users to access one or more accounts in the account records. For example, the different users may access the accounts, conduct transactions, or otherwise interact with an institution using the plurality of devices. The computing device may receive, from a user device, a request for access to an account, and may also receive, from one or more databases, account data corresponding to the account. The account data may indicate one or more logins originated from the user. Based on the account data, the computing device may determine a device history comprising a set of devices used by the user to login to the account within a predetermined time. The account data may be provided as input to the trained first machine learning model, and data indicating device reliability for the set of devices may be received as output from the trained first machine learning model. Based on the data indicating device reliability for the set of devices, the computing device may generate a set of modified device choices by excluding one or more devices having corresponding reliability levels below a threshold value. The computing device may generate an authentication question comprising at least one device choice from the modified set of device choices. The computing device may provide the authentication question to the user device and receive, from the user device, a response to the authentication question. Accordingly, the computing device may grant the user device access to the account based on the response to the authentication question matching a correct answer.

The training data to train the first machine learning model may include device information such as a frequency of use for each device, a duration of use for each device, and a time lapsed since a last use for each device. The training data may include web browser information corresponding to a web browser executed by the plurality of devices. For example, a user may use a particular browser to access a login page of an account. The computing device may use a combination of the device information and the browser information to generate an authentication question (e.g., did you use a "FirePhoenix" browser on a SmartPhone 13 to access your account in July 2021?) The training data may include account information such as one or more questions previously presented to the plurality of different users and response to these questions from different users. The training data may also include transaction information indicating whether transactions conducted by the plurality of devices were fraudulent.

The computing device may train a second machine learning model using training data including a history of authentication records. The history of authentication records may include authentication questions and responses associated with different type of devices used by the plurality of different users and the corresponding scoring schemes. The computing device may provide, as input to the trained second machine learning model, input data comprising the authentication question and the response to the authentication question from the user. The computing device may receive, as output from the trained second machine learning model, output data indicating a recommended threshold value associated with the user. Devices having reliability levels falling below the recommended threshold value may be excluded from a list of valid candidates to generate authentication questions. The trained second machine learning model may then be further trained. For example, the computing device may receive user feedback information indicating whether the set of devices associated with the account data were valid candidates Based on the user feedback information, the computing device may re-train the second machine learning model to modify the recommended threshold value associated with the set of devices.

The computing device may generate the authentication question that includes candidate answers including a first device (e.g., a real device) from the modified set of device choices and a second device (e.g., a false device) that is not included in the set of devices. To reduce guessability, the first device and the second device may be associated with a same device manufacturer or a similar price point. For example, the first device and the second device might be different models of the same phone manufactured by the same company. Additionally and/or alternatively, the first device and the second device may be available at a same period of time. For example, an imposter might have knowledge that the user typically uses a particular brand of phone. In such a situation, it may be more difficult for the imposter to figure out the particular model of the brand of phone that the user conducted transactions in the past.

Aspects described herein improve the functioning of computers by improving the accuracy and security of computer-implemented authentication processes. The steps described herein recite improvements to computer-implemented authentication processes, and in particular improve the accuracy and utility of authentication questions used to provide access to computing resources. This is a problem specific to computer-implemented authentication processes, and the processes described herein could not be performed in the human mind (and/or, e.g., with pen and paper). For example, as will be described in further detail below, the processes described herein rely on the processing of transaction and account data, the dynamic computer-implemented generation of authentication questions, and the use of various machine learning models.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
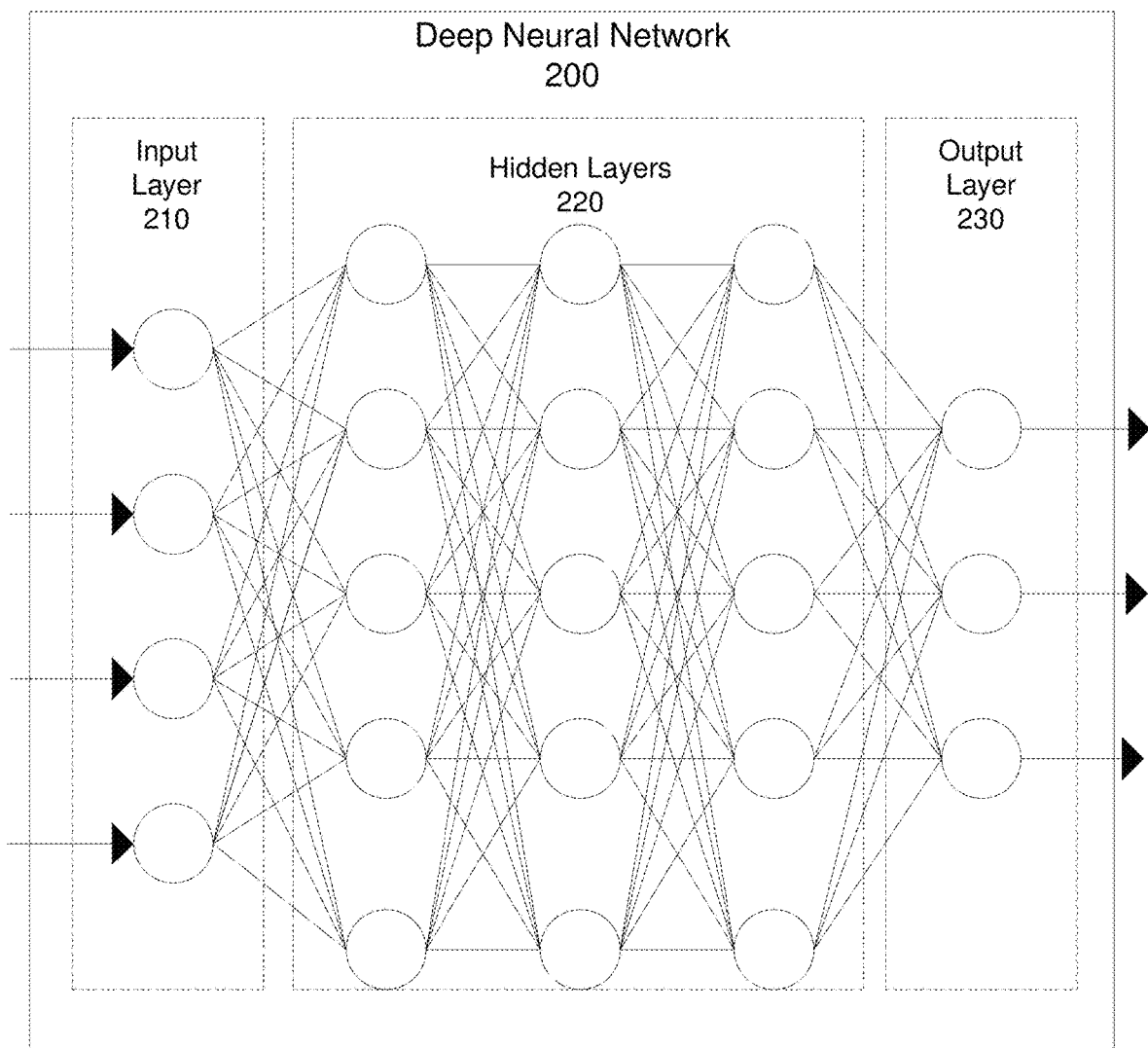
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
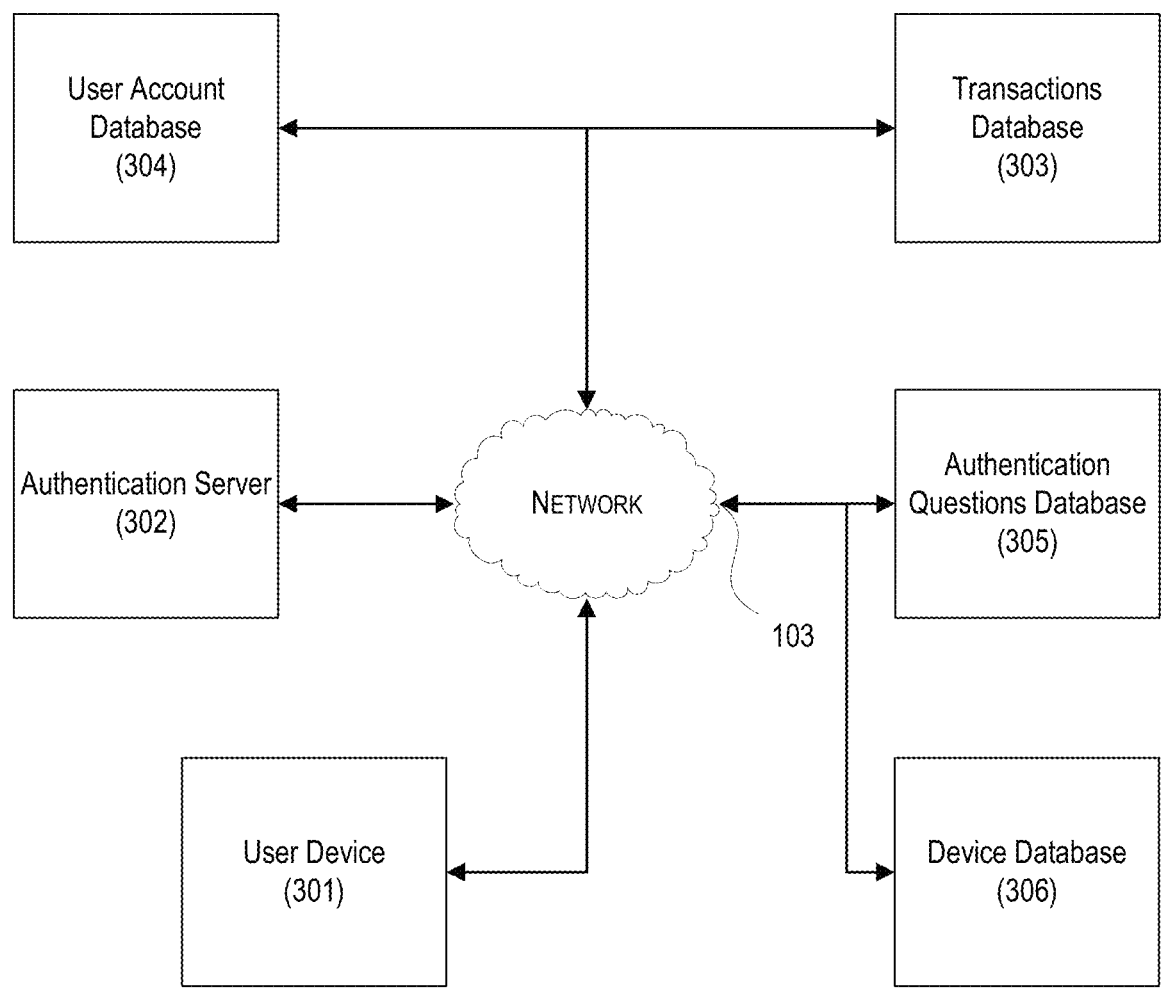
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user account database 304, an authentication questions database 305, and a device database 306. The network 103 may be the same or similar as the network 103 of FIG. 1. Each of the user device 301, the authentication server 302, the transactions database 303, the user account database 304, the authentication questions database 305, and/or the device database 306 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). The user device 301 shown here might be a smartphone, laptop, or the like, and the nature of the communications between the two might be via the Internet, a phone call, or the like. For example, the user device 301 might access a website associated with the authentication server 302, and the user device 301 might provide (e.g., over the Internet and by filling out an online form) candidate authentication credentials to that website. The authentication server 302 may then determine whether the authentication credentials are valid. For example, the authentication server 302 might compare the candidate authentication credentials received from the user device 301 with authentication credentials stored by the user account database 304. In the case where the communication is telephonic, the user device 301 need not be a computing device, but might be, e.g., a conventional telephone.

The transactions database 303 might comprise data relating to one or more transactions conducted by one or more accounts associated with an organization. For example, the transactions database 303 might maintain all or portions of a general ledger for various accounts associated with one or more users at a particular institution. The data stored by the transactions database 303 may indicate one or more merchants (e.g., where funds were spent), a transaction amount spent (e.g., in one or more currencies), a transaction date and/or time (e.g., when funds were spent), or the like. The data stored by the transactions database 303 might be generated based on one or more transactions conducted by one or more users. For example, a new transaction entry might be stored in the transactions database 303 based on a user making a payment to a credit card or mortgage account. As another example, a new transaction entry might be stored in the transactions database 303 based on a recurring charge (e.g., a subscription fee) being charged to an account. The data stored by the transactions database 303 might be related to a fund transfer between a first user account and a second user account or between two accounts of a same user.

The user account database 304 may store information about one or more user accounts, such as a username, password, a billing address, an emergency contact, a phone number, other demographic data about a user of the account, or the like. For example, as part of creating an account, a user might provide a username, a password, and/or one or more answers to predetermined authentication questions (e.g., "What is the name of your childhood dog?"), and this information might be stored by the user account database 304. The authentication server 302 might use this data to generate authentication questions. The user account database 304 might store demographic data about a user, such as her age, gender, billing address, occupation, education level, income level, and/or the like.

The account data stored by the user account database 304 and the transactions database 303 may, but need not be related. For example, the account data stored by the user account database 304 might correspond to a user account for a bank website, whereas the account data stored by the transactions database 303 might be for a variety of accounts (e.g., credit cards, checking accounts, savings accounts) managed by the bank. As such, a single user account might provide access to one or more different accounts, and the accounts need not be the same. For example, a user account might be identified by a username and/or password combination, whereas an account might be identified using a unique number or series of characters.

The authentication questions database 305 may comprise data which enables the authentication server 302 to present authentication questions. An authentication question may be any question presented to one or more users to determine whether the user is authorized to access an account. For example, the question might be related to personal information about the user (e.g., as reflected by data stored in the user account database 304), might be related to past transactions of the user (e.g., as reflected by data stored by the transactions database 303), or the like. The authentication questions database 305 might comprise data for one or more templates which may be used to generate an authentication question based on transaction information (e.g., from the user account database 304 and/or the transactions database 303). The authentication questions database 305 might additionally and/or alternatively comprise one or more static authentication questions, such as an authentication question that is used for a wide variety of users (e.g., "What is your account number?"). An authentication question might correspond to a transaction occurred or not occurred in the past. The authentication questions database 305 might additionally and/or alternatively comprise historical authentication questions. For example, the authentication questions database 305 might comprise code that, when executed, randomly generates an authentication question, then stores that randomly-generated authentication question for use with other users.

The authentication questions stored in the authentication questions database 305 may be associated with varying levels of difficulty. Straightforward questions that should be easily answered by a user (e.g., "Which model of smartphone do you own?") might be considered easy questions, whereas complicated answers that require a user to remember far into the past (e.g., "What brand laptop did you use last year to access your account?") might be considered difficult questions. The authentication questions stored in the authentication questions database 305 may be associated with varying levels of memorability and guessability. Including one or more device choices in the authentication questions may promote memorability, given that a legitimate user may readily identify a device if she used that device to conduct any transactions with the account in a predetermined period of time. However, certain devices may have low reliability levels. For example, some devices may be used less frequently and/or for a brief period of time. Some devices may be involved with fraudulent transactions. Excluding devices having low reliability levels may minimize confusion and increase the security of the user accounts.

The device database 306 might store data relating to one or more devices, including the true or false device choices for the users. The device database 306 may store device records including a device identifier, a device name, a manufacture name, a model or type of the device, and/or a price range associated with the device. The device records may include a user identifier, a timeframe that the device was used by the user, a frequency of use, and/or a last used timestamp. The device records may further include an indication whether the device was involved in a fraudulent transaction associated with a user account of the user. The device records may also include browser information, such as a type and version of the browser that the user used to access one or more accounts of the user for online banking. The device records may be associated with a user pattern indicating the device, a location (e.g., a MAC address or a GPS location), a time of a day and/or a time period, that the user regularly logged in to conduct transactions via the device. The device records may include information on a manufacturer, a model, a timeframe that the model was available on the market, and a popularity indicator. For example, the popularity may be inferred from the sales information of the corresponding model in a geographic area. The device records may be collected from public resources, or manufacturer reported data such as from a manufacturer's website.

An organization may build a proprietary version of the device database 306, for example, based on an aggregation of transaction records in transactions database 303 or user account records in user account database 304. As a user logins to her account or a transaction arrives from a transaction stream, the corresponding user account record or transaction record may be processed, cleaned, and/or enhanced with a variety of services. For example, when a user logs in to an online account, a browser or a browser extension may collect the device and/or browser related information. An institution may receive the transaction information in a transaction stream, the transaction information may be in the form of a line of data that offers limited information about the transaction, with each piece of information appearing in certain locations within the line of data. The device or browser information may appear in a specific location and may include characters in the abbreviated form or a machine level identifier. The institution may process this abbreviated form, convert the machine level identifier into a meaningful device or browser name in a human readable format, and store it in the device database 306.

An organization may use a third-party API to gather device information, such as a device model and manufacturer information, to be stored in the device database 306. An organization may maintain more static device information in its proprietary device database 306. An institution may use the third-party API to get device availability timeframes, price ranges, popularities, manufacturer social media handle, or other device information that may change over time.

The data stored by the device database 306 might be used to generate authentication questions that comprise both correct answers (e.g., based on data from the transactions database 303 or user account database 304 indicating one or more real devices used by a user to login to an account or conduct a transaction) and false answers (e.g., based on data from the device database 306, which might be randomly-selected devices that a user has not used in the past). For example, a computing device may receive from device database 306 indications (e.g., device names, device identifiers) of different devices. The computing device may further receive transaction data from transaction database 303 or account data from user account database 304 indicating one or more successful logins or transactions conducted by a user. The computing device may determine one or more devices related to a user and store a list of true device choices or false device choices in the device databases 306. The list of the true device choices may be further modified by excluding certain devices with the corresponding low reliability levels. For example, the devices might be used by a user less frequently or the devices might be associated with fraudulent transactions. As such, an authentication question may be generated based on the modified device choices.

Having discussed several examples of computing devices which may be used to implement some aspects as discussed further below, discussion will now turn to a method for computer-based authentication in a manner that excludes unreliable devices from being presented in true device options presented to users.

Figure 4:
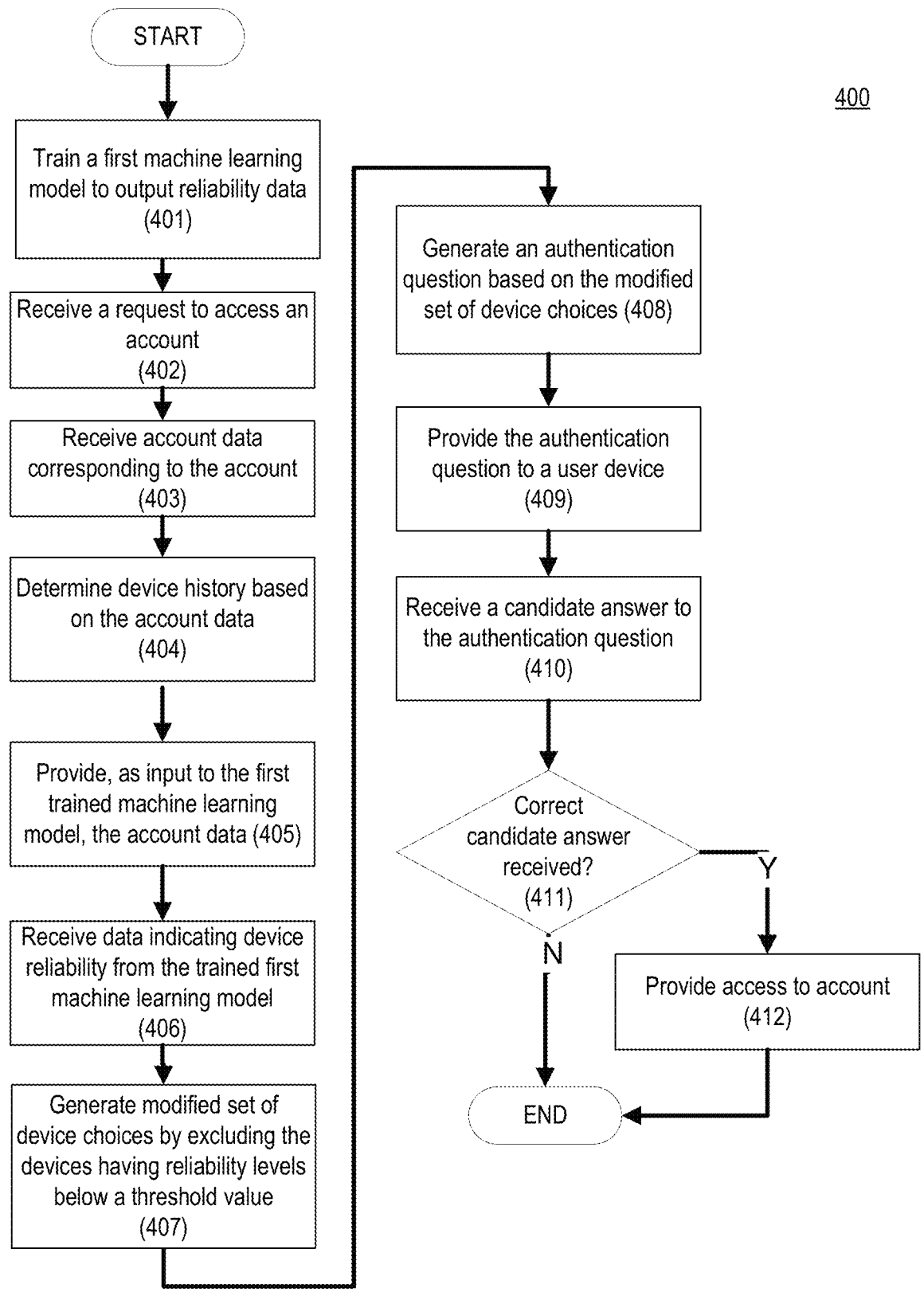
FIG. 4 depicts a flow chart comprising steps which may be performed for computer-based authentication using knowledge of former devices.

FIG. 4 illustrates an example method 400 for computer-based authentication using former devices in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired.

Some conventional systems may maintain a record of successful authenticated devices, and consider a previously authenticated device as more trusted because the server has seen a successful authentication from this device in the past. In contrast, the present embodiment may maintain account records that include a device history of successful logins and the corresponding login or transaction history. Based on repeated and multiple accesses of the account by a device, a machine learning model may determine a reliability level of the device. An increased reliability level may reflect, for example, the user used an owned device to repeatedly access an account, rather than using a borrowed device on a one-time usage basis. The devices in the device history and the corresponding reliability levels may be used to authenticate any devices used in the past or in the future. A computing device may implement a higher level of security using authentication questions generated based on the device history and login/transaction history. The authentication questions may query a user's knowledge of devices as a part of the multi-factor authentication process. This implementation improves computer authentication by asking questions that might be easily answered by a legitimate user, but would be difficult for malicious users to answer.

In step 401, a computing device (e.g., authentication server 302) may train a first machine learning model using training data comprising account records from a plurality of different users and pre-labelled reliability data for the devices in the corresponding account records. The account records may indicate a history of users logging in and whether the users might remember certain devices under certain circumstances based on the device reliability data. The trained first machine learning model may output an indication of device reliability data associated with a particular device. The account records may be associated with a plurality of devices used by the plurality of different users to access one or more accounts in the account records. For example, the first machine learning model may be implemented via the deep neural network 200 and/or the machine learning software 127. The account records may indicate a frequency of use for each device, a duration of use for each device and a time lapsed since a last use by a user. A first device may be less reliable if it was used with a low frequency, used for a short duration of time, and/or there was a long time lapsed since the user last used the first device, as the user may tend to forget about the first device that was not frequently used or not recently used. If a user borrowed a device and used it for one-time access to her account. The borrowed device may be considered as not a reliable candidate for authentication questions, given that the user may tend to forget such one-time usage. A second device may be more reliable if it was used with a high frequency, or for a prolonged duration of time, and/or there was a short time lapsed since the user last used the first device, as the user may tend to remember the second device that was frequently used or recently used. The first device may be tagged in the training data as not reliable or less reliable. The second device may be tagged as more reliable. The first and second devices may also be tagged with the corresponding reliability scores or levels.

The account records may indicate types of the devices related to the users logging in and whether the users might remember certain types of devices under certain circumstances. For example, a user might use three types of devices to access her account in the past year: her own smart phone, a tablet and a desktop computer in a public library. The user may readily remember the smart phone and forget about the desktop computer, particularly in the situations that she might use the smart phone more frequently and the desktop computer very occasionally. As such, different types of devices may be tagged with different reliability scores or levels. For example, the smart phone may be tagged with a relatively high reliability, the tablet may be tagged with a medium reliability and the desktop computer may be tagged with a relative low reliability.

The account records may indicate security levels of the devices and the possibilities that the devices might be compromised under certain circumstances. For example, a user might use three types of devices to access her account in the past year: her own smart phone, a tablet shared with family members, and a desktop computer in a public library. The security level of the smart phone may be relatively higher than that of the tablet and the desktop computer. As such, different types of devices may be tagged with different reliability scores or levels. For example, the smart phone may be tagged with a relatively high reliability, the tablet may be tagged with a medium reliability and the desktop computer may be tagged with a relative low reliability.

The first machine learning model may be trained based on training data including a combination of device type information and web browser information that the users executed on the devices to access the accounts or conduct transactions with the accounts. For example, the training data may include whether the users used certain web browsers to access the accounts. The browser information may be gleaned from authentication sessions when the users logged in their accounts. The browser information may be identified in a header section of the API request via a user agent string. An organization may parse a User-Agent (UA) string contained in HTTP headers related to a web browser application and translate the UA string to an understandable device type and browser type. For example, a first UA string "Mozilla/5.0 (X11; CrOS x86_64 8172.45.0) AppleWebKit/537.36 (KHTML, like Gecko) Chrome/51.0.2704.64 Safari/537.36" may indicate a Chrome OS-based laptop computer using Chrome browser. A second UA string "Mozilla/5.0 (Windows NT 6.1; WOW64) AppleWebKit/537.36 (KHTML, like Gecko) Chrome/47.0.2526.111 Safari/537.36" may indicate a Windows 7-based desktop computer using a Chrome browser. A third UA string "Mozilla/5.0 (Linux; Android 7.0; Pixel C Build/NRD90M; wv) AppleWebKit/537.36 (KHTML, like Gecko) Version/4.0 Chrome/52.0.2743.98 Safari/537.36" may indicate a Google Pixel C tablet. A fourth UA string "Mozilla/5.0 (iPhone; CPU iPhone OS 11_0 like Mac OS X) AppleWebKit/604.1.38 (KHTML, like Gecko) Version/11.0 Mobile/15A372 Safari/604.1" may indicate an Apple iPhone X. Based on the four UA strings as noted above, the computing device may ask the user to select the browser/device information including the options: 1) a Chrome browser on a laptop computer; 2) a Chrome browser on a desktop computer; 3) a Chrome browser on a Google Pixel C tablet; and 4) a Safari browser on an Apple iPhone X.

The first machine learning model may be trained based on training data including account information such as one or more questions previously presented to the users for authentication, and responses from the users. For example, the questions may be related to the users' device history, the types of the devices or browsers that the users used in the past, the users response to those questions, and indications whether the users correctly answered the questions.

In step 402, the computing device may receive, from a user device, a request for access to an account associated with a first user. The request may be associated with access, by a user, to a website, an application, or the like. The request may additionally and/or alternatively be associated with, for example, a user device calling into an Interactive Voice Response (IVR) system or similar telephone response system. For example, the computing device may receive an indication of a request for access to an account responsive to a user accessing a log-in page, calling a specific telephone number, or the like. The request may specifically identify an account via, for example, an account number, a username, or the like. For example, a user might call an IVR system and be identified (e.g., using caller ID) by their telephone number, which might be used to query the user account database 304 for a corresponding account.

In step 403, the computing device may receive, from one or more databases, account data corresponding to an account of the user. The account data may indicate one or more logins originated from the user or one or more transactions conducted by the user. The account data may be received from, e.g., the transactions database 303 or user account database 304. For example, the account data may be related to credit card payment, fund transfer, mortgage payment, and the like. The account data might correspond to a period of time, such as a recent period of time (e.g., the last day, the last week, last month, the last two months, or the like) or a prolonged period of time (e.g., last year, last two years or five years). The account data may also indicate whether the user conducted one or more logins or transactions using a particular device. The device information may be retrieved from, for example, device database 306. For example, a payment to a credit card account might be related to a device identifier that links to a device record in the device database 306. The device record might contain more details on the device name, model, manufacturer information, price range, availability window, browser information, and the like.

The account data may indicate account profile information. The account profile information may be received from, e.g., the user account database 304. For example, the account data may comprise account profile information related to, such as a billing address, a phone number or an email address. The account data may be related to user logins to a banking website or an account to conduct transactions related to the account. The account data may also indicate demographic data about the user such as age, gender, location, occupation, education level, income level, etc.

In step 404, the computing device may determine device history comprising a set of devices associated with the account data in a predetermined period of time. The device history may indicate use, by a user, of a set of devices to conduct one or more logins or transactions (e.g., login to an account, transfer funds, making payment to a mortgage account) within a predetermined period of time (e.g., a month, a year or five years). Based on the account data, the computing device may determine that the user used different devices to login to and access her accounts in the past 5 years for various tasks such as making credit card payment and mortgage payment and fund transfers. For example, the user used a SmartPhone 13 Pro to access her account for 40 times, a SmartPhone SE for 70 times, a SmartPhone 7 for 50 times, a SmartPad Pro for 10 times and a SmartPad Air for three times.

In step 405, the computing device may provide the account data as input to the trained first machine learning model. The account data may include one or more logins or transactions conducted by the user in a predetermined period of time (e.g., past five years) using one or more devices. The account data may be processed to extract information such as the frequency of use, a duration of use and a time lapsed since a last use for each device. For example, the account data might indicate that the user used a SmartPad Air for three times in the last five years, and the last use of the SmartPad Air was four years ago. The account data may be processed to extract browser information that the user might use different types or versions of browsers on different devices at different times. The account data may be linked to device information from device database 306, which may be processed to extract the device name, the location of the device when it was used to access an account, the device manufacturer, the device model or type, the device price point, and the like. The account data may be linked to device validity information, which may be processed to extract a time span or time range that the device is available to the users in the marketplace or is otherwise valid or supported. For example, information related to a time or timeframe of relevancy may be manually configured or collected from a third-party data source, as a manufacturer of the device may acknowledge when it would stop supporting the devices. A web crawler may be used to find the release date and the date the manufacturer stopped supporting a particular device.

The device database 306 might indicate associations between different devices, such as devices with similar brands, similar models, similar designs, and the like. As such, the computing device might process the association information to identify, for a particular device, one or more similar devices. In this manner, the computing device might ask authentication questions that may include a valid device and various similar devices, but those similar devices would be false answers to the authentication question.

In step 406, the computing device may receive, from the trained first machine learning model, data indicating device reliability for the set of devices. The trained first machine learning model may output, for example, a reliability value between 0 and 1 to indicate the reliability level of each device. A reliability value "0" may indicate the device is not reliable, while a reliability value "1" may indicate the device is reliable. For example, the trained first machine learning model may output the reliability values for the corresponding devices such as a SmartPhone 13 Pro (0.6), a SmartPhone SE (0.9), a SmartPhone 7 (0.58), a SmartPad Pro (0.42) and a SmartPad Air (0.1). In a circumstance where a user may use the SmartPhone 13 Pro and the SmartPhone SE more frequently and more recently than other devices, the trained first machine learning model may provide, as output, an indication of relatively high reliability levels for these two devices. As an example, in a circumstance where a user may use the SmartPhone 7 frequently but less recently, it may be assigned a medium reliability level. The user may use the SmartPad Air occasionally (e.g., 10 times), which may be assigned a low reliability level. The user may rarely use the SmartPad Air and might not have used the device for a long time, which may be assigned to an extremely low reliability level.

In some examples, the computing device may identify a transaction record related to a purchase of a device (e.g., a SmartPhone 13 Pro). The computing device may identify, based on the login history in the account data, that the user has logged in to her accounts using the purchased device. Based on the extra layer of confirmation in the transaction record, the trained first machine learning model may increase the reliability level of a particular device.

Unlike some conventional systems that maintain a record of successful authenticated devices, and consider a previously authenticated device as more trusted because the server has seen a successful authentication from this device in the past, the present embodiment may maintain account records that include a device history of successful logins and the corresponding transaction history. Based on repeated and multiple accesses of the account by a device, the trained machine learning model may determine a reliability level of the device. An increased reliability level may reflect, for example, the user used an owned device to repeatedly access an account, rather than using a borrowed device on a one-time usage basis. The devices in the device history and the corresponding reliability levels may be used to authenticate any devices used in the past or future devices. For example, a user may attempt to use a new device to access the account. The computing device may use information on other devices in the device history and their reliability levels to generate authentication questions to authenticate this new device. In another example, a user may call in to a call center for an account that might be locked or frozen. The computing device may implement a higher level of security using authentication questions generated based on the device history. The authentication questions may query a user's knowledge of devices she used in the past, for example, in the past five years, as a part of the multi-factor authentication process. This implementation may improve computer authentication by asking questions that might be easily answered by a legitimate user, but would be difficult for malicious users to answer.

In step 407, the computing device may generate a modified set of true device choices associated with the user by excluding one or more devices having reliability levels below a threshold value. For example, the set of true device choices determined for the user in step 404 may initially include five devices: a SmartPhone 13 Pro (0.85), a SmartPhone SE (0.9), a SmartPhone 7 (0.58), a SmartPad Pro (0.42) and a SmartPad Air (0.1). The computing device may determine a threshold value of 0.4 and exclude devices, such as the SmartPad Air (0.1), with reliability levels below the threshold value of 0.4. The computing device may generate the modified set of true device choices including three devices: the SmartPhone 13 Pro (0.6), the SmartPhone SE (0.9), the SmartPhone 7 (0.58) and the SmartPad Pro (0.42).

The threshold value may be established in a variety of ways. In some examples, the threshold value may be set manually by an administrator. Additionally and/or alternatively, the computing device may train a second machine learning model to determine one or more threshold values based on training data. For example, the training data may comprise a history of authentication records, such that the authentication records may be processed to identify instances of past questions where a user did not remember a device and instances of past questions where a user did remember a device. Along those lines, the history of authentication records may include authentication questions (e.g., "Did you use [DEVICE 1] yesterday to log in to this website?") and responses (e.g., instances of correct responses, instances of incorrect responses) associated with different type of devices used by the plurality of different users. The training data may additionally and/or alternatively include reliability levels associated with different devices used by different users to access their accounts. For example, the training data may indicate that, based on a study, users are more likely to remember their personal smartphones than a tablet. As another example, the training data may indicate that users generally remember a newer model of smartphone more than an older model of smartphone. The training data may additionally and/or alternatively include whether the questions are authentication questions to request access to the accounts, or whether the devices might be involved in fraudulent transactions. For example, the training data might indicate that malicious users often incorrectly answer questions relating to certain devices when trying to fraudulently access an account. The second machine learning model may be trained, using such training data, to, in response to input indicating a particular device, assign a weight to that particular device. That weight may be an indication of a likelihood that a user may correctly answer a question about the particular device when the device may have certain properties (e.g., types, recencies, and/or frequencies). In other words, the weight may indicate a memorability of the device, such that a low weight might indicate that a user might not remember using the device at a particular time, whereas a high weight might indicate that the user might remember using the device at a particular time. If the question and answer are from a user using a device for fraudulent transactions, the corresponding question, answer and device might be tagged with a low weight (e.g., a zero weight).

Based on the training described above, the second machine learning model may assign different weights to different devices in the training data. For example, if a device may be used more recently, such a device may be easier for an imposter to guess, a relatively lighter weight might be assigned to such device. On the other hand, a device used a long time ago might be more difficult for the imposter to guess, and a greater weight might be assigned to an older device. The second machine learning model may be trained to assign, to input data indicating a particular device, a weight to that particular device. The second machine learning model may be trained, using training data, to provide weights based on input data comprising, e.g., the frequency of the use of the devices, the longevity of the use of the devices, the types of the authentication questions and whether the user answered the questions partially successful. For example, a first user may answer two of the five questions correctly and a second user may answer all five questions correctly. A relatively greater weight might be assigned to the responses of the second user in the training data. The second machine learning model may also be trained to provide weights based on, e.g., the type of the devices. For example, a first record in the training data for a first user may include authentication questions and answers related to SmartPhone devices, a second record in the training data for a second user may include authentication questions and answers related to SmartPad devices, and a third record for a third user may include authentication questions and answers related to both SmartPhone and SmartPad devices. The second machine learning model may be trained to set a relatively less weight for the first set of records, given that the SmartPhone devices tend to be more popular and more easily guessable. The second machine learning model may be trained to set a relatively greater weight for the second set of records, given that the SmartPad devices tend to be less popular and not easily guessable, particular for a specific type or model of the SmartPad. The second machine learning model may be trained to set a moderate weight for the third set of records containing both the SmartPhone and the SmartPad devices. In another example, the second machine learning model may be trained to recognize that a device used to login to a user account may be involved in a fraudulent transaction, and may set a relatively higher weight for the fraudulent device for increased security.

The computing device may provide, as input to the trained second machine learning model, input data comprising the authentication question and the response to the authentication question from the user. The computing device may receive, as output from the trained second machine learning model, output data indicating a recommended threshold value associated with the user. The second machine learning model may be different from the first machine learning model. For example, the first machine learning model may be an unsupervised model and the second machine learning model may be a supervised model, and vice versa. The first machine learning model may generate data indicating device reliability for each device in a user's device history. The second machine learning model may determine an appropriate reliability threshold for the computing device to exclude certain devices falling below the appropriate reliability threshold from the modified true device choices.

The second machine learning model may be re-trained based on user feedback information. Based on the user feedback on the list of devices that might be used by the user, the second machine learning model may adjust the recommended reliability threshold. For example, the second machine learning model may set a first reliability threshold (e.g., 0.4). The device history of the user may include five devices with corresponding reliability levels: a SmartPhone 13 Pro (with a reliability level of 0.85), a SmartPhone SE (with a reliability level of 0.9), a SmartPhone 7 (with a reliability level of 0.58), a SmartPhone Pro (with a reliability level of 0.42) and a SmartPad Air (with a reliability level of 0.1). Based on the first reliability threshold (e.g., 0.4), the computing device may identify four devices above the reliability threshold. The second machine learning model may adjust the first confidence threshold based on user feedback. For example, the computing device may present these four devices to the user and ask the user to identify whether she used any of these devices in the past five years. If the user reports that she used the SmartPhone 13 Pro (0.85), the SmartPhone SE (0.9), and the SmartPhone 7 (0.58), but not the SmartPhone Pro (0.42), the second machine learning model may be re-trained to increase the first reliability threshold, for example, from 0.4 to 0.5, so that only the SmartPhone 13 Pro (0.85), the SmartPhone SE (0.9), and the SmartPhone 7 (0.58) would be identified as real device choices for the user.

Figure 5:
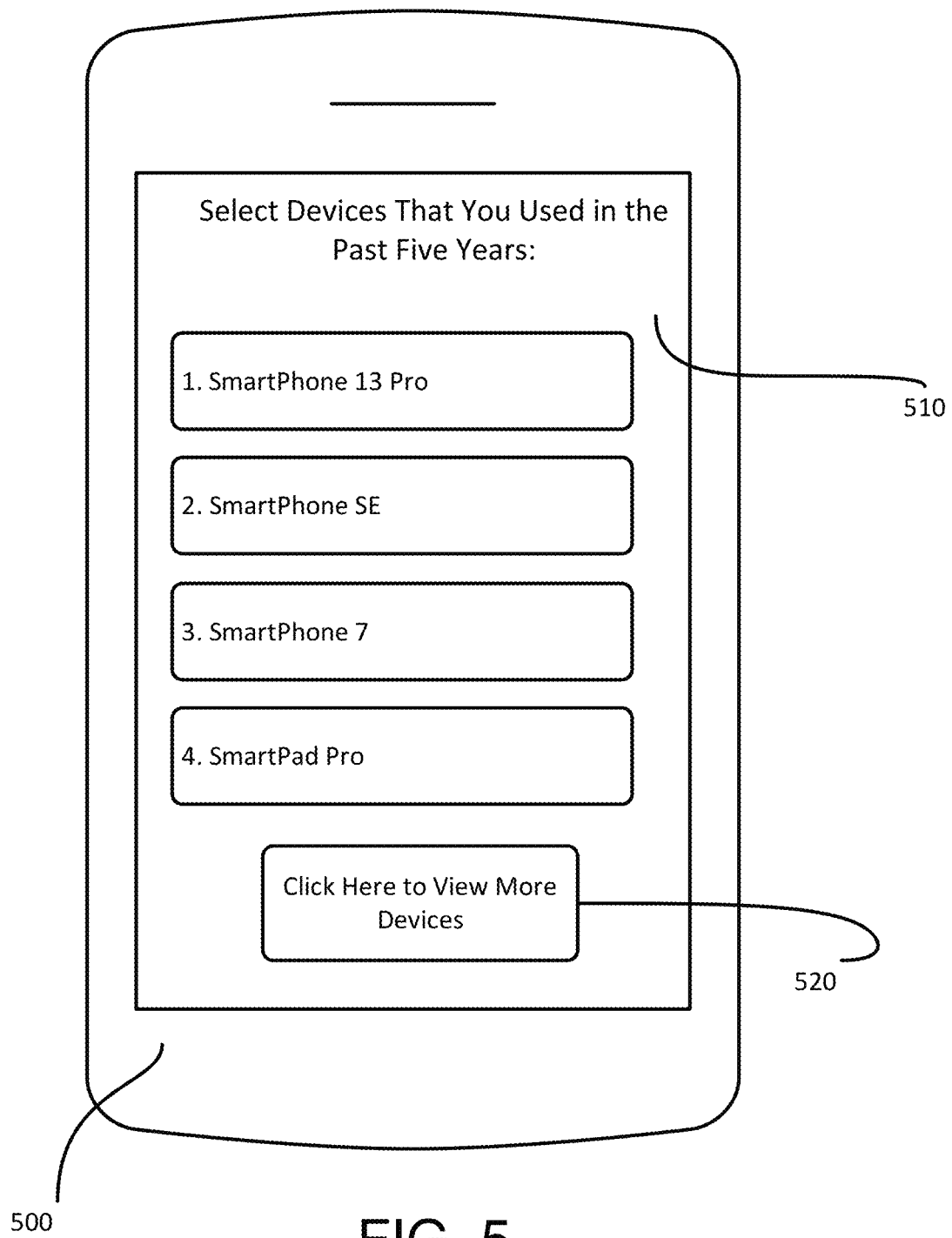
FIG. 5 depicts an example interface for a user to provide feedback.

FIG. 5 depicts example interfaces for a user to provide feedback in accordance with the process described above. As illustrated in FIG. 5, the computing device may present to a user an interface 510 on a user device 500 with a list of devices that might be used by a user in the past five years. The computing device may present the list of devices based on their corresponding reliability levels. For example, the computing device may select the first four devices from the device history with the highest reliability levels to be presented to the user. The computing device may also select devices that beyond a first reliability threshold (e.g., 0.4).

In the example of FIG. 5, the computing device may present a list of devices based on logins or transactions conducted by a user in the past five years. The user may select one or more devices from a list comprising, for example, a SmartPhone 13 Pro, a SmartPhone SE, a SmartPhone 7, and a SmartPad Pro. The computing device may use the corresponding SmartPhone 13 Pro (0.85), SmartPhone SE (0.9), SmartPhone 7 (0.58) and SmartPad Pro (0.42) as part of the tagged training data. The computing device may receive a response from the user for a selection of one or more names that the user does not recognize as a true device (e.g., the SmartPad Pro). The computing device may provide an option 520 for the user to view additional devices from the user's device history and provide feedback. The computing device may provide the user feedback as tagged training data to re-train the second machine learning model. The second machine learning model may be re-trained to output a recommended reliability threshold (e.g., 0.5).

In step 408, the computing device may generate, based on the modified true device choices, an authentication question for the user. The authentication question may include true devices that the first user has transacted with in a predetermined period of time (e.g., the past five years). The authentication question may include false devices that the user has not used in a predetermined period of time (e.g., the past five years). The authentication question may ask the user, for example, whether she used one or more devices from a list of candidate devices in the past five years. The candidate devices may include, for example, three devices from a modified list of true device choices, and one device from a list of false devices. The authentication question may ask a user, for example, to select one or more devices from a list of candidate devices that the user has not used in the past five years. The candidate devices may include, for example, three devices from the list of false devices, and one true device from the modified list of true device choices. The candidate devices may not include any devices that have been excluded from the modified set of devices (e.g., devices falling below the reliability threshold). Using these candidate devices that have high reliability may reduce the likelihood of confusion and promote account security.

In some examples, the authentication question may ask one or more devices the user used for logins. The authentication question may ask a device the user used six years ago, if the device history indicates that the user had used the device in such a high frequency that the user might remember this device. Other examples of questions may include: "Which device did you use in 2019?," "Which of the following phones have you owned?," "Which of the following phones have you used since you first registered with our service in 2015?," and/or "What is the first device you used in 2015?" The authentication question may include a time-sensitive element to reduce guessability. For example, if the authentication question asks "What phone did you use in the past three years?," the computing device may check the log-in or transaction history of the user in the past three years and identify the relevant devices and models used during the timeframe. Given that an illegitimate user might not have access to such detailed login or transaction history in the extended timeframe, the guessability may be reduced for the heightened security on the protected account.

In some examples, including false device choices in the authentication questions may reduce guessability. The authentication questions may include false device choices generated based on the same manufacturer of the real devices. For example, a roommate of the user might know that the user uses a SmartPhone. In this situation, the roommate might, when trying to improperly access the user's account, know that answers relating to Pixel or Android phones are incorrect. In contrast, if the authentication question asks a malicious user which of the five different models of the SmartPhone that the user used to access the account, the imposter might not have that knowledge, which would make it harder for that malicious user to improperly access the account. Similarly, to lower guessability, authentication questions might be generated based on false device choices that have similar price point as that of the real devices. For example, if the user's device history includes a SmartPhone 13 Pro, the computing device may generate false device choices that are comparable to the SmartPhone in the similar price range, such as a Genius P3, or a TriStar S22. As such, the computing device may reduce guessability by using false device choices that have similar manufacturers or price points as the real device choices.

The device-based authentication might be used together with transaction-based authentication questions to promote increased security on the account. For example, a computing device may ask the user five authentication questions: one question may be device-based question and four may be transaction-based questions. The computing device may determine whether to grant the user account to the account based on the combined questions.

In step 409, the computing device may present the authentication question. Presenting the authentication question may comprise causing one or more computing devices to display and/or otherwise output the authentication question. For example, the computing device may cause presentation, to the user, of the authentication question. Such presentation might comprise providing the authentication question in a text format (e.g., in text on a website), in an audio format (e.g., over a telephone call), or the like.

In step 410, the computing device may receive a candidate answer to the authentication question. A candidate answer may be any indication of a response, by a user, to the authentication question presented in step 408. For example, where an authentication question comprises a candidate device, the candidate response might comprise a selection of true or false for the candidate device. As another example, in the case of a telephone call, the candidate response might comprise an oral response to an authentication question provided using a text-to-speech system over the call.

In step 411, the computing device may determine whether the candidate answer received in step 410 is correct. Determining whether the candidate answer is correct may comprise comparing the answer to the correct answer determined as part of generating the authentication question in step 408. If the candidate answer is correct, the method 400 proceeds to step 412. Otherwise, the method 400 ends.

In step 412, the computing device may provide access to the account. For example, the computing device may provide, based on the candidate response, the user device access to the account. Access to the account might be provided by, e.g., providing a user device access to a protected portion of a website, transmitting confidential data to a user device, allowing a user to request, modify, and/or receive personal data (e.g., from the user account database 304 and/or the transactions database 303), or the like. In some examples, the computing device may provide the user access to the account when the candidate response is, for example, 100% accurate. Alternatively, or additionally, the computing device may provide the user access to the account based on if the user has answered a threshold number of questions correctly (e.g., above 90%).

The computing device may determine a scoring scheme associated with each response received from the user. Different types of devices might correspond to different memorability. In the scoring scheme, certain responses might not be penalized as much as other responses if the user answers them incorrectly. For example, if the user uses two SmartPads, the user might not readily recall the model of the SmartPad. In contrast, while the user has one or more SmartPhones, it is more likely for the user to know whether she has for example, a SmartPhone 8 or 9 due to popularity of the device and marketing effort of the manufacturer. Likewise, if the user uses a laptop, it is less likely that the user would know the model of the laptop, particularly at the microprocessor level. In such situations, the computing device may assign less penalties in the scoring scheme if the user answers the trickier questions incorrectly.

Figure 6B:
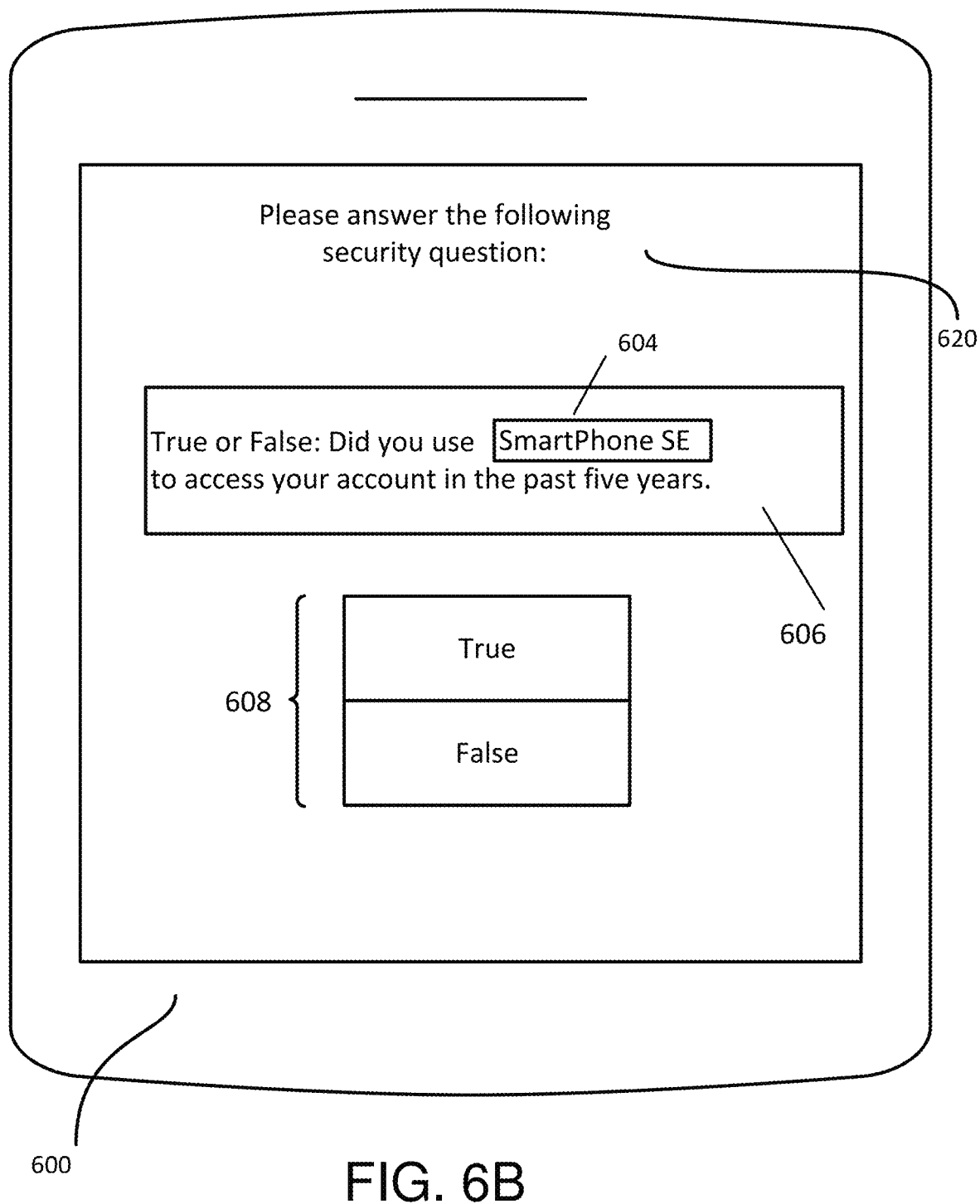
FIG. 6B depicts an example of an authentication question that may be presented to a user.

FIGS. 6A-B illustrate an example of generating an authentication question that may be presented to a user. The elements in FIGS. 6A-B are representations of various steps in the method 400 depicted in FIG. 4, such as those depicted with respect to steps 408 through 411 of the method 400. As illustrated in FIG. 6A, the computing device (e.g., authentication server 302) may determine initial device choices for a user based on the user's device history. The true device choices might be a device that the user has used to login or conduct a transaction, for example, in the past five years using the user's account. The computing device may determine the initial true device choices 601 for a user in a predetermined time period, e.g. the past five years. For example, the initial true device choices 601 may include a SmartPhone 13 Pro, a SmartPhone SE, a SmartPhone 7, a Genius P4 and a SmartPad Air. The computing device may determine, using a trained first or second machine learning model, the reliability level for each device. The computing device may generate modified true device choices 602 by excluding or removing the SmartPhone 7, the Genius P4 and the SmartPad Air from the set of true device choices. After the computing device exclude or remove devices with low reliability, the modified true device choices 602 may include a subset of the initial choices: the SmartPhone 13 Pro and the SmartPhone SE.

The authentication question 620 may be generated and presented on user device 600 in FIG. 6B based on the described herein for reducing confusion and increasing memorability with respect to presented device choices. For purposes of illustration, the authentication question 620 is illustrated as an authentication question based on modified true device choices 602 in FIG. 6A. The authentication question 620 may include a prompt 606. The prompt may include a device identifier 604. The authentication question 620 may further include a set of possible answers 608 (e.g., a manner for the user to answer True ("T") or False ("F") in response to the prompt 606). The authentication question 620 may be generated based on the modified true device choices 602. By generating the authentication question 620 based on the modified true device choices 602, the computing device may avoid presenting an authentication question that may confuse the user by excluding data (e.g., a device) having a low reliability level.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   one or more processors; and
   memory storing instructions that, when executed by the one or more processors, cause the computing device to:
   train, using training data comprising account records from a plurality of different users, a first machine learning model to output, for a particular device, an indication of device reliability data associated with the particular device, wherein the account records are associated with a plurality of devices used by the plurality of different users to access one or more accounts in the account records;
   receive, from a user device, a request for access to an account associated with a user;
   receive, from one or more databases, account data corresponding to the account,
   wherein the account data indicates one or more logins originated from the user;
   determine, based on the account data, device history comprising a set of devices used by the user to login to the account within a predetermined period of time;
   provide, as input to the trained first machine learning model, the account data;
   receive, from the trained first machine learning model, data indicating device reliability for the set of devices;
   determining, based on the device history, one or more false devices that the user has not used to access the account for the predetermined period of time;
   generate, based on the data indicating device reliability for the set of devices, a set of modified device choices by excluding one or more devices having corresponding reliability levels below a threshold value, from the set of devices, wherein the set of modified device choices comprise the one or more false devices;

generate an authentication question comprising at least one device choice from the modified set of device choices;

generate, based on the account data and the modified set of device choices, a correct answer to the authentication question;

provide the authentication question to the user device;

receive, from the user device, a response to the authentication question;

compare the response to the authentication question to the correct answer; and grant the user device access to the account based on the response to the authentication question matching the correct answer.

2. The computing device of claim 1, wherein the training data comprises device information for the plurality of devices used by the plurality of different users comprising:
   a frequency of use for each device of the plurality of devices,
   a duration of use for each device of the plurality of devices, and
   a time lapsed since a last use for each device of the plurality of devices.

3. The computing device of claim 1 wherein the training data comprises web browser information corresponding to a web browser executed by the plurality of devices used by the plurality of different users.

4. The computing device of claim 1, wherein the training data comprises account information comprising:
   one or more questions previously presented to the plurality of different users, and
   responses from the plurality of different users.

5. The computing device of claim 1, wherein the training data comprises transaction information indicating whether transactions conducted by the plurality of devices were fraudulent.

6. The computing device of claim 1, wherein the instructions, when executed by the one or more processors, cause the computing device to:
   train, based on second training data comprising a history of authentication records, a second machine learning model to determine recommended reliability thresholds, wherein the history of authentication records comprise authentication questions and responses associated with different type of devices used by the plurality of different users and the corresponding scoring schemes;
   provide, as input to the trained second machine learning model, input data comprising the authentication question and the response to the authentication question from the user; and
   receive, as output from the trained second machine learning model, output data indicating a recommended threshold value associated with the user.

7. The computing device of claim 6, wherein the instructions, when executed by the one or more processors, cause the computing device to:
   receive user feedback information indicating whether the set of devices associated with the account data were valid candidates; and
   based on the user feedback information, re-train the second machine learning model to modify the recommended threshold value associated with the set of devices.

8. The computing device of claim 1, wherein the instructions, when executed by the one or more processors, cause the computing device to:
   generate the authentication question comprising a first device from the modified set of device choices and a second device that is not included in the set of devices, wherein the first device and the second device are associated with a same device manufacturer.

9. The computing device of claim 1, wherein the instructions, when executed by the one or more processors, cause the computing device to:
   generate the authentication question comprising a first device from the modified set of device choices and a second device that is not included in the set of devices, wherein the first device and the second device are associated with a similar price point.

10. The computing device of claim 1, wherein the instructions, when executed by the one or more processors, cause the computing device to:
    generate the authentication question comprising a first device from the modified set of device choices and a second device that is not included in the set of devices, wherein the first device and the second device are available at a same period of time.

11. The computing device of claim 1, wherein the set of modified device choices comprise one or more real devices that the user has used to access the account for the predetermined period of time.

12. A method comprising:
    training, using training data comprising account records from a plurality of different users, a first machine learning model to output, for a particular device, an indication of device reliability data associated with the particular device, wherein the account records are associated with a plurality of devices used by the plurality of different users to access one or more accounts in the account records;
    receiving, from a user device, a request for access to an account associated with a user;
    receiving, from one or more databases, account data corresponding to the account,
    wherein the account data indicates one or more logins originated from the user;
    determining, based on the account data, device history comprising a set of devices used by the user to login to the account within a predetermined period of time;
    providing, as input to the trained first machine learning model, the account data;
    receiving, from the trained first machine learning model, data indicating device reliability of the set of devices;
    determining, based on the device history, one or more false devices that the user has not used to access the account for the predetermined period of time;
    generating, based on the data indicating device reliability of the set of devices, a set of modified device choices by excluding one or more devices having corresponding confidence levels below a threshold value, from the set of devices, wherein the set of modified device choices comprise the one or more false devices;
    generating an authentication question comprising at least one device choice from the modified set of device choices;
    generating, based on the account data and the modified set of device choices, a correct answer to the authentication question;
    providing the authentication question to the user device;

receiving, from the user device, a response to the authentication question;
comparing the response to the authentication question to the correct answer; and
granting the user device access to the account based on the response to the authentication question matching the correct answer.

13. The method of claim 12, wherein the training data comprises device information for the plurality of devices used by the plurality of different users comprising:
  a frequency of use for each device of the plurality of devices,
  a duration of use for each device of the plurality of devices, and
  a time lapsed since a last use for each device of the plurality of devices.

14. The method of claim 12, wherein the training data comprises web browser information corresponding to a web browser executed by the plurality of devices used by the plurality of different users.

15. The method of claim 12, wherein the training data comprises account information comprising:
  one or more questions previously presented to the plurality of different users, and responses from the plurality of different users.

16. The method of claim 12, wherein the training data comprises transaction information indicating whether transactions conducted by the plurality of devices were fraudulent.

17. One or more non-transitory computer-readable media storing instructions that, when executed by one or more processors, cause a computing device to:
  train, using training data comprising account records from a plurality of different users, a first machine learning model to output, for a particular device, an indication of device reliability data associated with the particular device, wherein the account records are associated with a plurality of devices used by the plurality of different users to access one or more accounts in the account records;
  receive, from a user device, a request for access to an account associated with a user;
  receive, from one or more databases, account data corresponding to the account, wherein the account data indicates one or more logins originated from the user;
  determine, based on the account data, device history comprising a set of devices used by the user to login to the account within a predetermined period of time;
  provide, as input to the trained first machine learning model, the account data;
  receive, from the trained first machine learning model, data indicating device reliability of the set of devices;
  determining, based on the device history, one or more false devices that the user has not used to access the account for the predetermined period of time;
  generate, based on the data indicating device reliability of the set of devices, a set of modified device choices by excluding one or more devices having corresponding confidence levels below a threshold value, from the set of devices, wherein the set of modified device choices comprise the one or more false devices;
  generate an authentication question comprising at least one device choice from the modified set of device choices;
  generate, based on the account data and the modified set of device choices, a correct answer to the authentication question;
  provide the authentication question to the user device;
  receive, from the user device, a response to the authentication question;
  compare the response to the authentication question to the correct answer; and
  grant the user device access to the account based on the response to the authentication question matching the correct answer.

18. The computer-readable media of claim 17, wherein the instructions, when executed by the one or more processors, cause the computing device to:
  generate the authentication question comprising a first device from the modified set of device choices and a second device that is not included in the set of devices, wherein the first device and the second device are associated with a same device manufacturer.

19. The computer-readable media of claim 17, wherein the instructions, when executed by the one or more processors, cause the computing device to:
  generate the authentication question comprising a first device from the modified set of device choices and a second device that is not included in the set of devices, wherein the first device and the second device are associated with a similar price point.

20. The computer-readable media of claim 17, wherein the instructions, when executed by the one or more processors, cause the computing device to:
  generate the authentication question comprising a first device from the modified set of device choices and a second device that is not included in the set of devices, wherein the first device and the second device are available at a same period of time.

* * * * *